United States Patent
Zhang et al.

(10) Patent No.: US 11,599,733 B2
(45) Date of Patent: Mar. 7, 2023

(54) PROGRAM INTEGRATED INFORMATION MANAGEMENT FOR CLOUD-BASED APPLICATIONS

(71) Applicant: International Business Machines Corporation, Armonk, NY (US)

(72) Inventors: Li Bo Zhang, Beijing (CN); Jin Zhang, Beijing (CN); Nan Chen, Beijing (CN); Ju Ling Liu, Beijing (CN); Xin Peng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 16/666,459

(22) Filed: Oct. 29, 2019

(65) Prior Publication Data
US 2021/0124804 A1 Apr. 29, 2021

(51) Int. Cl.
*G06F 40/51* (2020.01)
*G06F 16/901* (2019.01)
*G06F 40/14* (2020.01)
*G06F 40/58* (2020.01)
*G06F 40/174* (2020.01)

(52) U.S. Cl.
CPC .......... *G06F 40/51* (2020.01); *G06F 16/9027* (2019.01); *G06F 40/14* (2020.01); *G06F 40/174* (2020.01); *G06F 40/58* (2020.01)

(58) Field of Classification Search
CPC .......... G06F 40/51; G06F 40/61; G06F 40/14; G06F 40/58; G06F 40/174; G06F 16/9027
See application file for complete search history.

(56) References Cited

U.S. PATENT DOCUMENTS 6,781,609 B1 * 8/2004 Barker ............... G06F 9/451
715/764
7,149,964 B1 * 12/2006 Cottrille ............. G06F 40/58
715/234

(Continued)

OTHER PUBLICATIONS

Kato et al. "A Utility for Showing Program Integrated Information Changes between Versions in a Translation Verification Test," Dec. 22, 2008, <https://ieeexplore.ieee.org/document/4724481>, pp. 330-337 (Year: 2008).*

(Continued)

*Primary Examiner* — Kyle R Stork
(74) *Attorney, Agent, or Firm* — David B. Woycechowsky

(57) ABSTRACT

Methods, systems, computer program products for Program Integrated Information (PII) translation management of an application are provided. The method, according to an embodiment of the present invention, PII translation corresponding to the application of a base version is determined as PII translation of a base version by one or more processing units, and then differences between PII translation corresponding to the application of a subsequent version and PII translation of the base version is determined as PII translation of a subsequent version. Then, in a data structure, it is recorded with PII translation of the base version as a starting node of the data structure and PII translation of the subsequent version as a subsequent node of the starting node, wherein nodes in the data structure are correlated to and accessible to the application of corresponding versions.

6 Claims, 6 Drawing Sheets

(56) References Cited

U.S. PATENT DOCUMENTS

| | | | |
|---|---|---|---|
| 8,903,710 B2 | 12/2014 | Luo et al. | |
| 2007/0242609 A1* | 10/2007 | Archer | H04L 12/66 370/241 |
| 2018/0329969 A1 | 11/2018 | Abrams | |
| 2020/0252260 A1* | 8/2020 | Tseng | H04L 41/0233 |

OTHER PUBLICATIONS

"Linux diff command," Oct. 23, 2019, https://web.archive.org/web/20190301000000*/https://www.computerhope.com/unix/udiff.htm>, pp. 1-22 (Year: 2019).*

Mell et al., "The NIST Definition of Cloud Computing", Recommendations of the National Institute of Standards and Technology, Special Publication 800-145, Sep. 2011, 7 pages.

\* cited by examiner

US 11,599,733 B2

PROGRAM INTEGRATED INFORMATION MANAGEMENT FOR CLOUD-BASED APPLICATIONS

BACKGROUND

The present application relates to computing, and more specifically, to methods, systems and computer program products for program integrated information management for applications.

There are two main types of translation involving a computer program. One involves manuals and the other involves Program Integrated Information (PII). PII translation is substantially different from ordinary text translation, as PII is separated out of a computer program into externalized text resource files to allow for translation outside the program development process per se. The contexts of the operations of a computer program have been discarded and translators have to translate phrases and words without context in these text resource files. A Translation Verification Test (TVT), which is done with the normal operations of the computer program, compensates for the lack of context during translation.

SUMMARY

According to an aspect of the present invention, there is a method, computer program product and/or system for Program Integrated Information (PII) translation management of an application that performs the following operations (not necessarily in the following order): (i) determining, by one or more processing units, PII translation corresponding to the application of a base version, as PII translation of a base version; (ii) determining, by one or more processing units, differences between PII translation corresponding to the application of a subsequent version and PII translation of the base version, as PII translation of a subsequent version; and (iii) recording, by one or more processing units, in a data structure, PII translation of the base version as a starting node of the data structure and PII translation of the subsequent version as a subsequent node of the starting node. Nodes in the data structure are correlated to and accessible to the application of corresponding versions These and other features and advantages of the present invention will be described in, or will become apparent to those of ordinary skill in the art in view of, the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
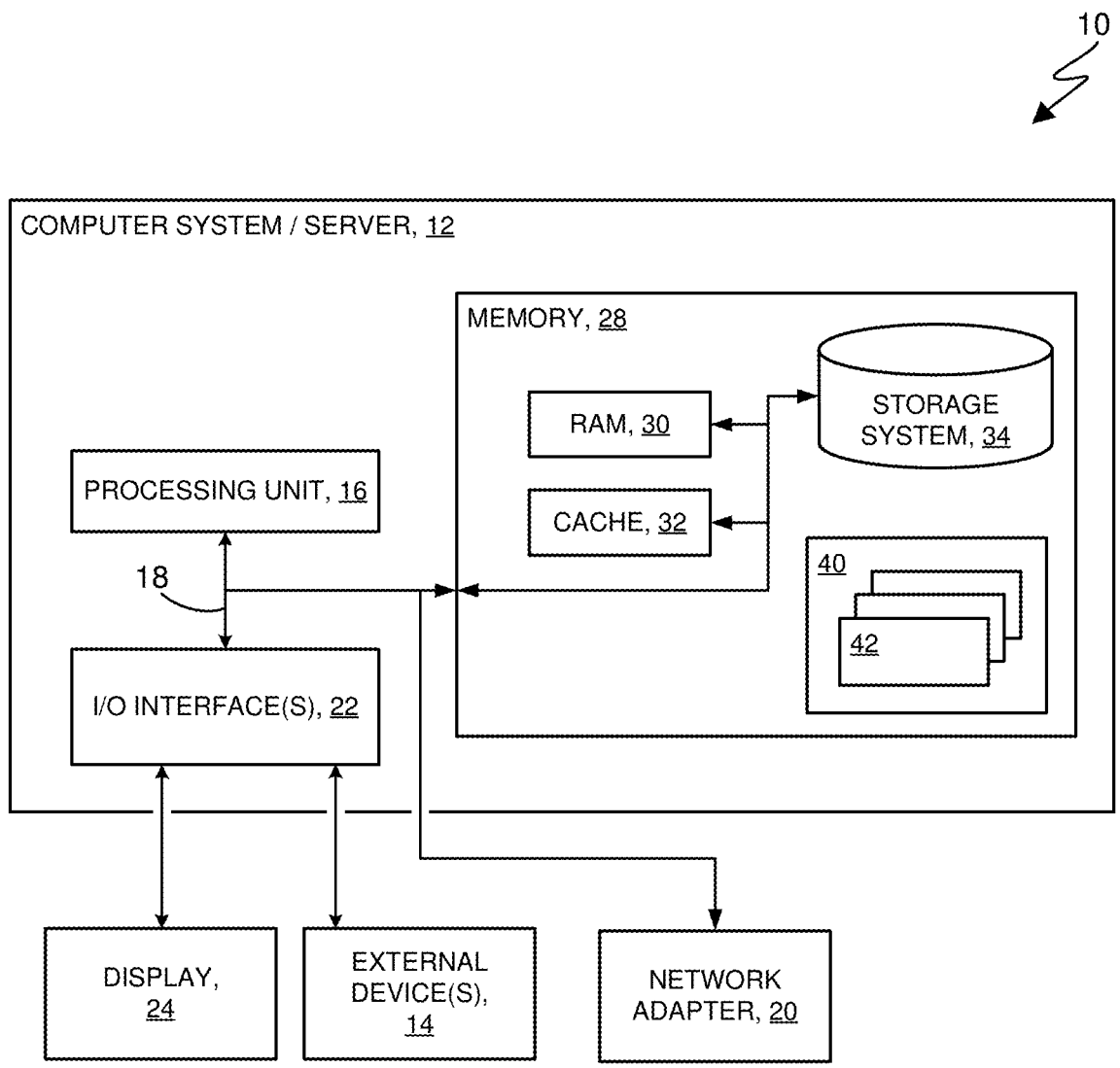
FIG. 1 depicts a cloud computing node in accordance with at least one embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Embodiments of the invention are targeting the problems stated out above and can be deployed on cloud computer systems which will be described in the following. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing unit 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
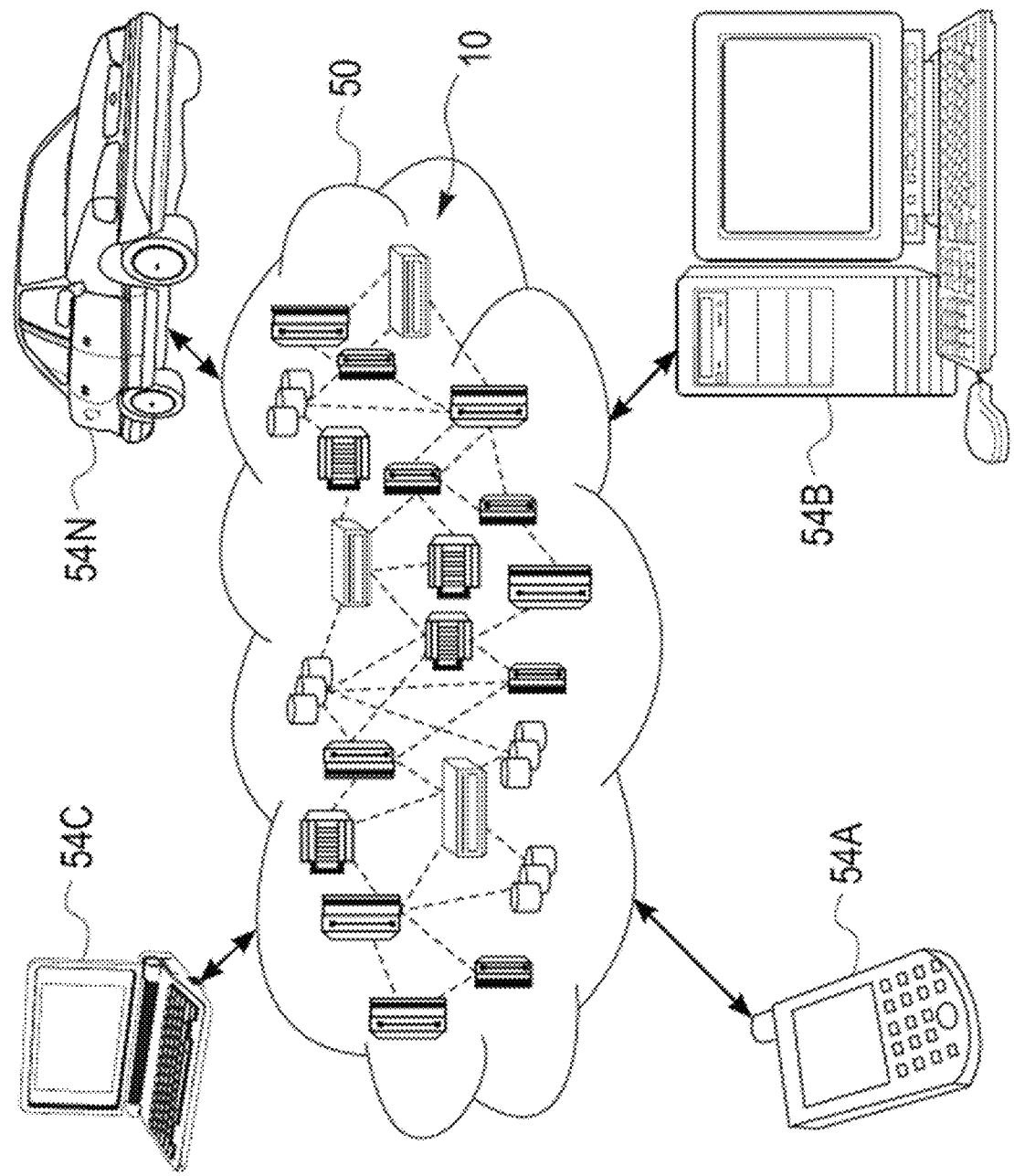
FIG. 2 depicts a cloud computing environment in accordance with at least one embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
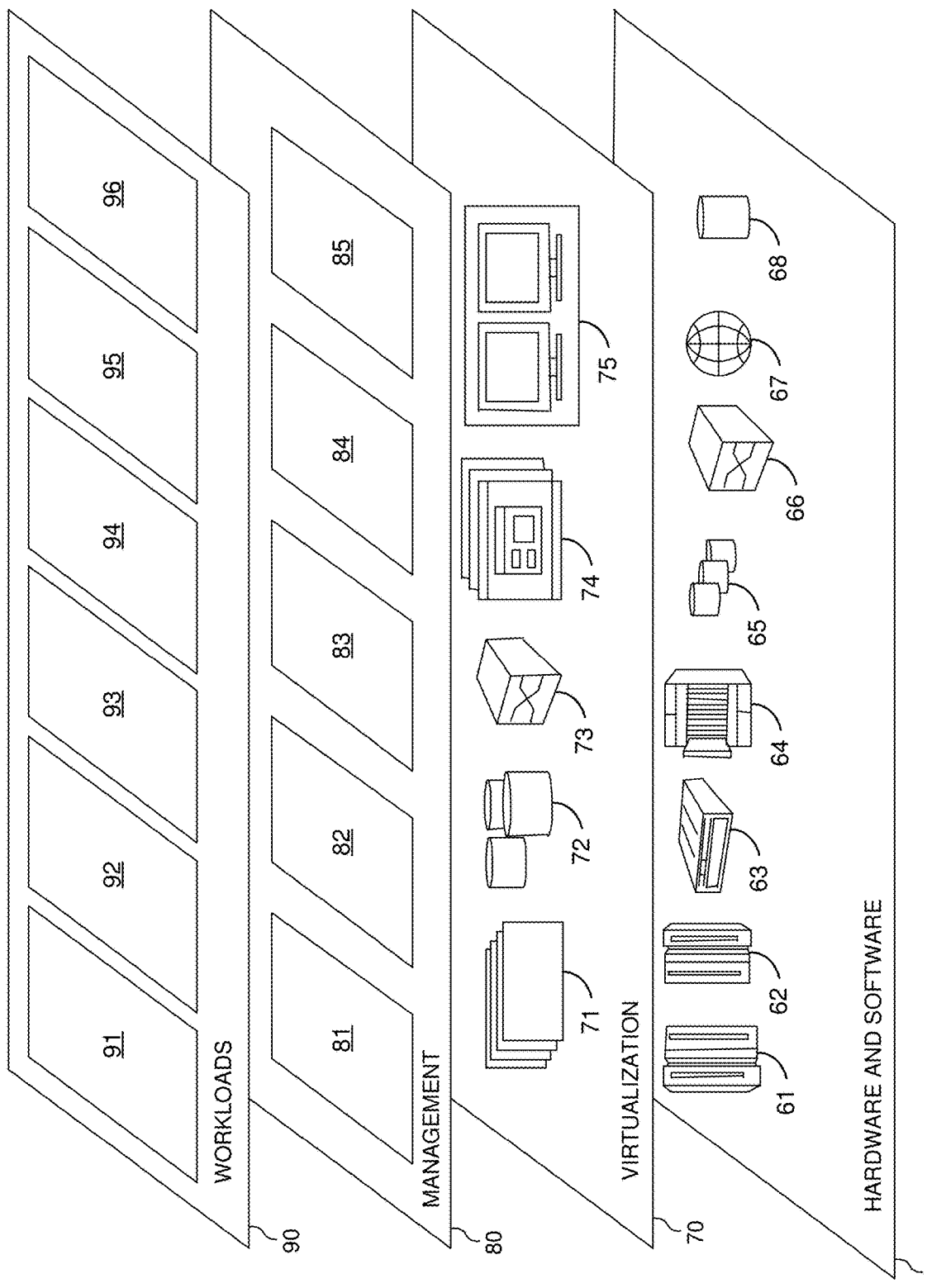
FIG. 3 depicts abstraction model layers in accordance with at least one embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and program integrated information management 96 according to embodiments of the invention.

Traditional program integrated information (PII) translation management, which typically synchronizes all PII translation associated with an application when the application is updated, encounters difficulties in cloud environments where different versions of the application may exist simultaneously and require multiple versions of PII translation stored respectively. With DevOps technologies where software release is faster than ever, there may exist a lot of different versions of the application, which further worsen the problem. There is a need for efficient management of PII translation for an application in cloud environments which allows for the co-existence of different versions of the application in cloud environments without bringing a lot of complexities. Exemplary embodiments of the invention tackle the above-mentioned problem and will be described in the following with reference to FIG. 4 and FIG. 5.

Figure 4:
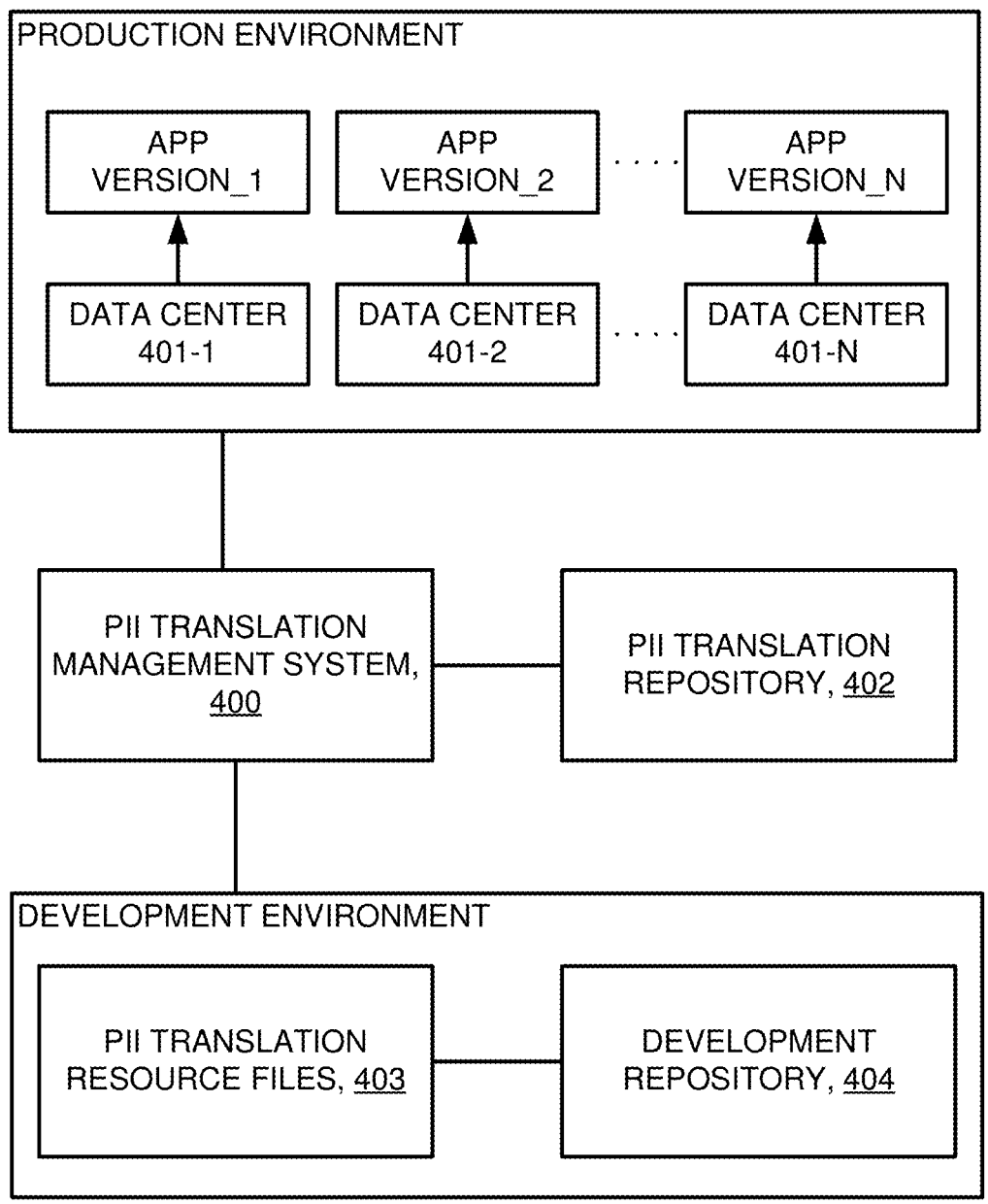
FIG. 4 depicts a block diagram of an exemplary system 400 in accordance with at least one embodiment of the present invention.

Referring now to FIG. 4, in which a block diagram of an exemplary system 400 according to an embodiment of the present invention.

In the lower part of FIG. 4, is depicted an exemplary development environment which comprises a development repository 404 storing the application in question of different versions that have been or are to be deployed to a production environment shown in the upper part of FIG. 4. The exemplary development environment also comprises a storage which stores respective PII translation resource files 403 correlated with the application of respective versions. PII translation resource files, e.g., Java™ resource bundles in prior art, are the resource files that stores locale-specific information (e.g., PII translation according to embodiments of the invention). PII translation resource files also stores PII keys used to retrieve associated PII translation. When the application is executed, it retrieves PII translation with PII keys for current user's locale. For example, if the current user's locale is set as fr_CA, which means the language setting is French and the location setting is Canada, PII translation in Canadian French will be retrieved with PII keys from the PII translation resource files. Note: the term "Java" may be subject to trademark rights in various jurisdictions throughout the world and are used here only in reference to the products or services properly denominated by the marks to the extent that such trademark rights may exist.

In the upper part of FIG. 4, it is shown in the production environment that there are multiple data centers 401-1, 401-2, . . . , 401-N with the application of version_1, version_2, . . . , version_N deployed thereon, respectively. Although it is shown that on each of the data centers the application of only one version is deployed, it should be pointed out that the application of more than one version may exist at the same time. For example, on data center 401-1, there may be version_1 and version_2 deployed respectively on e.g., different virtual machines or containers. FIG. 4 is merely a simplified illustration and should be understood to comprise all possible appropriate configurations.

In the middle part of FIG. 4, PII translation management system 400 according to an embodiment of the invention is shown, with PII translation repository 402 coupled to it. PII translation management system 400 is also coupled to both the development environment and the production environment. PII translation management system 400 manages PII translation associated with the application in question of the multiple versions (e.g., version_1, version_2, . . . , version_N) deployed on respective data centers (e.g., 401-1, 401-2, . . . , 401-N). PII translation management system 400 also manages PII translation associated with the application in question of respective versions developed and stored in the development environment and to be deployed to the production environment. In an initialization phase of the PII translation management system 400 according to an embodiment of the invention, the application of respective versions and associated respective PII translation are firstly analyzed, for example, by any code analysis tools. There are lots of such tools existing in prior art, proprietary of open source. For example, Git, is an open-source version control system, similar to other version control systems, e.g. Apache™ Subversion®, Concurrent Versions System (CVS), and Mercurial, which offers lots of code analysis tools. First, codes or change documents of the application of respective versions deployed on the data centers are analyzed, e.g., by code analysis tools, to determine a base version. The base version of the application according to an embodiment of the invention is the version based on which the application of at least one subsequent version is developed. Dependent upon the development of the application, more than one base version may be determined. For the purpose of simplification, the invention will be described with only one base version, however, it should be understood this should not adversely limit the scope of the invention. The application of the base version and its subsequent versions may also be retrieved from associated version control system of the application, e.g., any one of the version control system mentioned above. (Note: the term(s) "Apache™" and/or "Subversion®" may be subject to trademark rights in various jurisdictions throughout the world and are used here only in reference to the products or services properly denominated by the marks to the extent that such trademark rights may exist.)

Then, PII translation management system 400 determines PII translation corresponding to the application of the base version as PII translation of a base version. For a subsequent version of the base version, PII translation management system 400 determines differences between PII translation corresponding to the application of the subsequent version and PII translation of the base version, as PII translation of a subsequent version. For each of subsequent versions of the application deployed on the data centers, PII translation management system 400 determines differences between PII translation corresponding to the application of a specific version and PII translation of a previous version corresponding to the application of a previous version of the specific version, as PII translation of the specific version. For example, PII translation management system 400 determines Application v1.0 as the base version, then PII translation corresponding to the Application v1.0 is determined as PII translation of a base version, i.e., PII v1.0. Then PII translation management system 400 determines differences between PII translation corresponding to Application v1.1 (which is a subsequent version of Application v1.0) and PII translation (PII v1.0) corresponding to Application v1.0, as PII v1.1. For the application of a specific version, e.g., Application v1.3.1, differences between PII translation corresponding to the application of the specific version (Application v1.3.1) and PII translation of a previous version (PII v1.3) corresponding to the application of a previous version (Application v1.3) of the specific version (Application v1.3.1) are determined as PII translation of the specific version, i.e., PII v1.3.1. For the application deployed on the data centers, PII translation management system 400 carries out the above process for PII translations corresponding to all different versions.

After the above-mentioned process has been carried out completely, PII translation management system 400 records PII translation of all different versions in a data structure, e.g., in PII translation repository 402 of FIG. 4. The data structure is with PII translation of the base version as a starting node and PII translation of a subsequent version (which stores the differences between PII translation corresponding to the application of a subsequent version and PII translation corresponding to the application of the base version) as a subsequent node of the starting node. For PII translation of a specific version (which stores the differences between PII translation corresponding to the application of specific version and PII translation of a previous version corresponding to the application of a previous version of the specific version), it is recorded in the data structure as a subsequent node of the node which represents PII translation of the previous version of the specific version.

For example, PII translation management system 400 records in the data structure PII v1.0 as the starting node, then PII v1.1 as a subsequent node of the starting node. For PII v1.3.1, it is recorded in the data structure as a subsequent node of the node which represents PII v1.3. For the application deployed on the data centers, PII translation management system 400 records in the data structure PII translation of different versions.

It should be pointed out that in the case that there is more than one base version, more than one starting node may exist. Also, it should be pointed out that although here the starting node refers to the node that records PII translation of the base version (which is a root node of the data structure), however, according to an embodiment of the invention, a starting node may refer to any node in the data structure and used together with subsequent nodes to represent a relative relationships among different nodes. It should be also pointed out that although in the above it is described that PII translation of a base version is determined in connection with application of a base version, however, PII translation of a base version may be determined merely based on PII translation per se without considering the application, as long as correlation between PII translation of a certain version and the application of corresponding version is correctly configured.

Responsive to the completion of recording PII translation of respective versions in the data structure, PII translation management system 400 correlates nodes in the data structure to the application of corresponding versions. For example, the node recording PII v1.1 is correlated to Application v1.1, and the node recording PII v1.3.1 is correlated to Application v1.3.1. The correlation is to ensure the application of a specific version is able to retrieve corresponding PII translation of the specific version from the corresponding node in the data structure.

According to an embodiment of the invention, responsive to a detection of the application of a new version is developed and saved in the development repository 404 in the development environment, or prior to the deployment of the application of the new version to at least one of the data centers, differences between PII translation corresponding to the application of the new version and PII translation of a previous version corresponding to the application of a previous version of the new version are determined by PII translation management system 400, as PII translation of the new version. Then PII translation management system 400 records in the data structure, PII translation of the new version as a subsequent node of PII translation of the previous version. PII translation management system 400 further correlates the node which represents PII translation of the new version to the application of the new version, in order that PII translation of the new version may be retrieved upon the execution of the application of the new version.

According to embodiments of the invention, at least the following information is recorded in a node of the data structure, one or more PII keys and PII translation associated with the one or more PII keys. According to embodiments of the invention, fewer or more types of information may be recorded. According to an embodiment of the invention, the data structure may be in the format of tree structure stored in database, e.g., in data tables, data files, or data graphs, etc. However, the data structure may comprise any other appropriate structures and may be stored in any appropriate formats.

Figure 6:
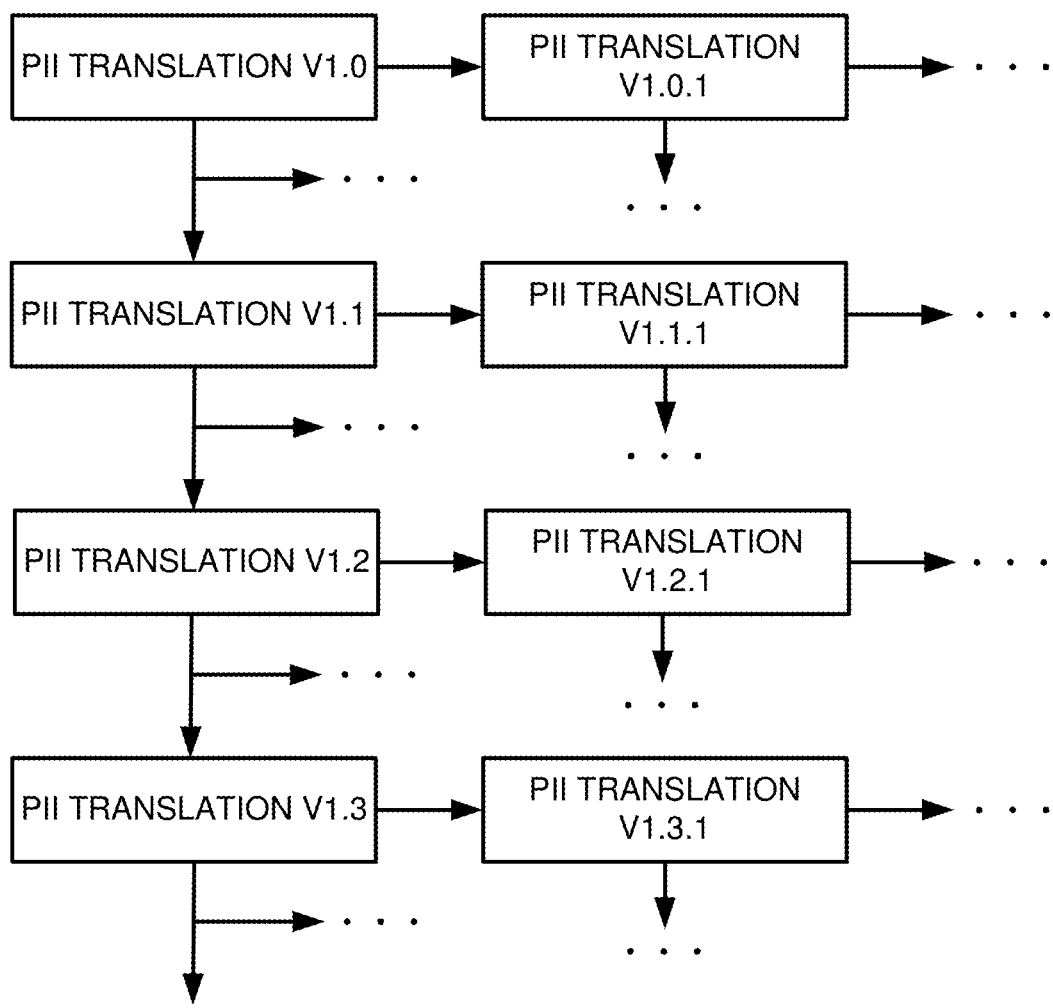
FIG. 6 depicts an example of the data structure with PII translation stored in corresponding nodes in accordance with at least one embodiment of the present invention.

An example of the data structure with PII translation stored in corresponding nodes is shown in FIG. 6. In FIG. 6, it is shown a tree structure with PII translation v1.0 as its starting node, and PII translation v1.0.1 and PII translation v1.1 as subsequent nodes of the starting node. The ellipses following PII translation v1.0, PII translation v1.0.1 indicate there are other subsequent nodes not shown in the tree structure. Similarly, PII translation v1.2 and PII translation v1.1.1 as subsequent nodes of node representing PII translation v1.1 and the ellipses following PII translation v1.1, PII translation v1.1.1 indicate there are other subsequent nodes not shown in the tree structure. It should be noted, the tree structure shown in FIG. 6 is merely for the purpose of illustration, therefore should not adversely limit the scope of the invention. On the contrary, any appropriate data structure may be used according to embodiments of the invention.

With the introduction of the data structure, embodiments of the invention enable efficient management of PII translation for an application in cloud environments which allows for the co-existence of different versions of the application in cloud environments without bringing a lot of complexities. In the meantime, as only changes are stored in each of the subsequent nodes and there is no need to store redundant PII translation, storage efficiency is improved.

According to embodiments of the invention, PII translation management system 400 may be an independent service component coupled to the production environment, an independent service component in the production environment, or integrated with any management components of the production environment, for example, with a hypervisor which manages virtual machines, a docker engine that manages docker containers, or any other appropriate management components. PII translation repository 402 may be of any kinds of storage system, locally or remotely accessible to PII translation management system 400.

According to an embodiment of the invention, responsive to an execution of the application of a certain version in runtime, PII translation management system 400 determines one or more PII keys associated with the application of the executed version, e.g., by receiving the one or more PII keys from the applications. PII translation management system 400 then determines the node in the data structure which is correlated to the application of the executed version. Based on the determined one or more PII keys, PII translation management system 400 retrieves PII translation recorded in the determined node. According to an embodiment of the invention, responsive to a detection of failing to retrieve in the determined node, PII translation associated with a certain PII key, PII translation management system 400 further retrieves in at least one previous node of the determined node, PII translation associated with the PII key that is failed to retrieve in the determined node. For example, in runtime, Application v1.3.1 is executed. PII translation management system 400 then determines one or more PII keys associated with Application v1.3.1. Then PII translation management system 400 determines that in the data structure, the node which represents PII v1.3.1 is associated with Application v1.3.1. PII translation management system 400 hence retrieves PII translation recorded in the node which represents PII v1.3.1. In the case that PII translation management system 400 fails to retrieve PII translation associated with a certain PII key, PII translation management system 400 further retrieves, based on the PII key, PII translation associated with the PII key that is failed to retrieve in the node which represents PII v1.3.1 in at least one of its previous node, e.g., a node representing PII v1.3. If PII translation management system 400 fails to retrieve PII translation associated with the PII key in the node representing PII v1.3, it may further retrieve PII translation associated with the PII key in a previous node of the node representing PII v1.3, for example, PII v1.2, until PII translation associated with the PII key is retrieved.

According to an embodiment of the invention, responsive to a determination that no PII translation recorded in in a starting node is retrieved by the application of any versions, PII translation management system 400 merges the starting node and its subsequent node as a new starting node, wherein PII translation recorded in the subsequent node is retrieved by the application of at least one version. For example, for a starting node representing PII v1.0, no PII translation recorded in it is retrieved by the application of any versions, PII translation management system 400 then merges it with its subsequent node, for example, the node representing PII v1.1. The node representing the merged node is now the new starting node, replacing the merged starting node. Starting node here may refer to any node in the data structure, as aforementioned.

Figure 5:
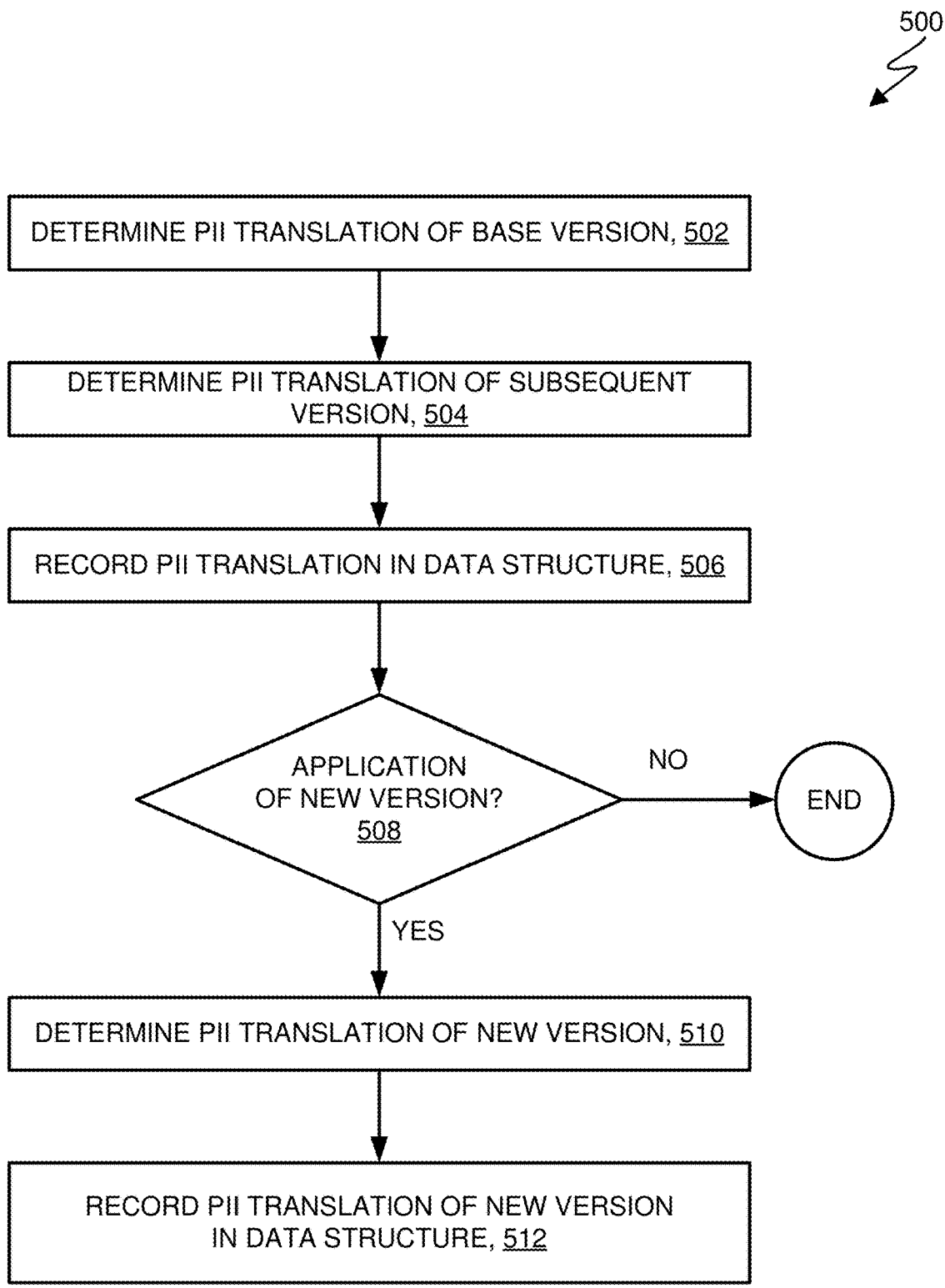
FIG. 5 depicts a flowchart of an exemplary method 500 in accordance with at least one embodiment of the present invention.

Now turning to FIG. 5, which depicts an exemplary method 500 according to an embodiment of the present invention.

At step 502, PII translation corresponding to the application of a base version is determined as PII translation of a base version, for example, by PII translation management system 400 in FIG. 4.

At step 504, differences between PII translation corresponding to the application of a subsequent version and PII translation of the base version are determined, for example, by PII translation management system 400 in FIG. 4, as PII translation of a subsequent version.

At step 506, the PII translation is recorded in a data structure, for example, by PII translation management system 400 in FIG. 4, PII translation of the base version as a starting node of the data structure and PII translation of the subsequent version as a subsequent node of the starting node, for example, in PII translation repository 402 in FIG. 4.

At step 508, if the application of a new version is not detected (step 508, "No" branch), in some embodiments, processing ends. Responsive to a detection of the application of a new version (step 508, "Yes" branch), differences between PII translation corresponding to the application of the new version and PII translation of a previous version corresponding to the application of a previous version of the new version is determined at step 510, for example, by PII translation management system 400 in FIG. 4, as PII translation of the new version. And then at step 512, the PII translation of the new version is recorded in the data structure as a subsequent node of PII translation of the previous version, for example, in PII translation repository 402 in FIG. 4.

According to an embodiment of the invention, the node in the data structure corresponding to PII translation of the new version to the application of the new version is further recorded, for example, by PII translation management system 400 in FIG. 4.

According to an embodiment of the invention, at least the following information is recorded in a node of the data structure: one or more PII keys, and PII translation associated with the one or more PII keys, for example, by PII translation management system 400 in FIG. 4 in PII translation repository 402 in FIG. 4.

According to an embodiment of the invention, responsive to an execution of the application of a certain version in runtime, one or more PII keys associated with the application of the executed version and the node in the data structure correlated to the application of the executed version, are determined. Then the PII translation is recorded in the determined node based on the determined one or more PII keys retrieved.

According to an embodiment of the invention, responsive to a detection of failing to retrieve the PII translation associated with a certain PII key from the determined node, the PII translation associated with the PII key (that is failed to retrieve in the determined node) is retrieved from at least one previous node of the determined node.

According to an embodiment of the invention, responsive to a determination that no PII translation recorded in the starting node is retrieved by the application of any versions, the starting node and its subsequent node is merged as a new starting node, wherein PII translation recorded in the subsequent node is retrieved by the application of at least one version.

It should be noted that the content rendering according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one illustrative embodiment of the present invention, there is provided methods, system and computer program products for Program Integrated Information (PII) translation management of an application. The method, according to an embodiment of the present invention, PII translation corresponding to the application of a base version is determined as PII translation of a base version by one or more processing units, and then differences between PII translation corresponding to the application of a subsequent version and PII translation of the base version is determined as PII translation of a subsequent version. Then, in a data structure, it is recorded with PII translation of the base version as a starting node of the data structure and PII translation of the subsequent version as a subsequent node of the starting node, wherein nodes in the data structure are correlated to and accessible to the application of corresponding versions.

Computer program products and computer systems for determining the source of activity during interaction with a user interface are also provided.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A computer implemented method (CIM) comprising:
receiving a first set of computer code corresponding to a involves Program Integrated Information (PII) translation of first version of an application;
receiving a second set of computer code corresponding to a PII translation of a second version of the first application;
determining a plurality of differences between the first set of computer code and the second set of computer code, with each difference corresponding to a location in the second computer code that does not match the first set of computer code and the manner in which the second set of code is different than the first set of computer code;
storing the first set of computer code in a repository;
storing difference data corresponding to the plurality of differences in the repository;
creating a hierarchical data structure that includes: (i) a first-version node that includes the first set of computer code, (ii) a second-version node that includes the second set of computer code, and (iii) a connection between the first-version node and the second-version node which indicates that the second-version node is a child node of the first-version node;
determining that first-version node no longer includes the first set of computer code corresponding to the first version of the first application; and
responsive to the determination that first-version node no longer includes the first set of computer code:
merging the first-version node and the second-version node into a single node that includes both of the following: a PII key from the first-version node and a PII key from the second version node so that the single node can be identified with either of these PII keys, and
storing the second set of computer code in the single node.

2. The CIM of claim 1:
providing the hierarchical data structure and its constituent nodes as an independent service component available within a runtime environment.

3. A computer program product (CPP) comprising:
a set of storage device(s); and
computer code stored collectively in the set of storage device(s), with the computer code including data and instructions to cause a processor(s) set to perform at least the following operations:
  receiving a first set of computer code corresponding to a involves Program Integrated Information (PII) translation of first version of an application,
  receiving a second set of computer code corresponding to a PII translation of a second version of the first application,
  determining a plurality of differences between the first set of computer code and the second set of computer code, with each difference corresponding to a location in the second computer code that does not match the first set of computer code and the manner in which the second set of code is different than the first set of computer code,
  storing the first set of computer code in a repository,
  storing difference data corresponding to the plurality of differences in the repository,
  creating a hierarchical data structure that includes: (i) a first-version node that includes the first set of computer code, (ii) a second-version node that includes the second set of computer code, and (iii) a connection between the first-version node and the second-version node which indicates that the second-version node is a child node of the first-version node,
  determining that first-version node no longer includes the first set of computer code corresponding to the first version of the first application, and
  responsive to the determination that first-version node no longer includes the first set of computer code:
    merging the first-version node and the second-version node into a single node that includes both of the following: a PII key from the first-version node and a PII key from the second version node so that the single node can be identified with either of these PII keys, and
    storing the second set of computer code in the single node.

4. The CCP of claim 3 wherein computer code further includes data and instructions to cause the processor(s) set to perform at least the following operations:
  providing the hierarchical data structure and its constituent nodes as an independent service component available within a runtime environment.

5. The CS of claim 3 wherein computer code further includes data and instructions to cause the processor(s) set to perform at least the following operations:
  providing the hierarchical data structure and its constituent nodes as an independent service component available within a runtime environment.

6. A computer system (CS) comprising:
a processor(s) set;
a set of storage device(s); and
computer code stored collectively in the set of storage device(s), with the computer code including data and instructions to cause the processor(s) set to perform at least the following operations:
  receiving a first set of computer code corresponding to a involves Program Integrated Information (PII) translation of first version of an application,
  receiving a second set of computer code corresponding to a PII translation of a second version of the first application,
  determining a plurality of differences between the first set of computer code and the second set of computer code, with each difference corresponding to a location in the second computer code that does not match the first set of computer code and the manner in which the second set of code is different than the first set of computer code,
  storing the first set of computer code in a repository,
  storing difference data corresponding to the plurality of differences in the repository,
  creating a hierarchical data structure that includes: (i) a first-version node that includes the first set of computer code, (ii) a second-version node that includes the second set of computer code, and (iii) a connection between the first-version node and the second-version node which indicates that the second-version node is a child node of the first-version node,
  determining that first-version node no longer includes the first set of computer code corresponding to the first version of the first application, and
  responsive to the determination that first-version node no longer includes the first set of computer code:
    merging the first-version node and the second-version node into a single node that includes both of the following: a PII key from the first-version node and a PII key from the second version node so that the single node can be identified with either of these PII keys, and
    storing the second set of computer code in the single node.

* * * * *